United States Patent
Mitsui

(10) Patent No.: US 7,045,728 B2
(45) Date of Patent: May 16, 2006

(54) MOVABLE CONTACT OF SLIDE SWITCH

(75) Inventor: Yuji Mitsui, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/226,279

(22) Filed: Sep. 15, 2005

(65) Prior Publication Data

US 2006/0060460 A1    Mar. 23, 2006

(30) Foreign Application Priority Data

Sep. 17, 2004 (JP) .............................. 2004-271474

(51) Int. Cl.
*H01H 1/36* (2006.01)

(52) U.S. Cl. .................. 200/252; 200/61.54; 200/16 D

(58) Field of Classification Search .... 200/16 R–16 D, 200/61.27, 61.3, 61.31, 61.54, 531, 536, 200/541, 547, 549, 550, 563, 571, 241, 243, 200/252, 253, 275, 283

See application file for complete search history.

(56) References Cited

U.S. PATENT DOCUMENTS

| | | | | |
|---|---|---|---|---|
| 4,152,565 A | * | 5/1979 | Rose | .......................... 200/548 |
| 5,587,886 A | * | 12/1996 | Lan | ............................. 200/252 |
| 6,103,980 A | * | 8/2000 | Gauthier | ................... 200/61.27 |
| 6,333,475 B1 | * | 12/2001 | Kontani | ..................... 200/61.34 |
| 6,399,905 B1 | * | 6/2002 | Nishikawa et al. | ....... 200/61.54 |
| 6,512,191 B1 | * | 1/2003 | Makino et al. | .............. 200/531 |
| 6,903,285 B1 | * | 6/2005 | Bosch et al. | ............. 200/61.54 |

FOREIGN PATENT DOCUMENTS

JP     2000-208003     7/2000

* cited by examiner

*Primary Examiner*—Michael A. Friedhofer
(74) *Attorney, Agent, or Firm*—Morgan, Lewis & Bockius LLP

(57) ABSTRACT

The fourth movable contact of a slide switch includes a first and a second U-shaped contact parts arranged so that opposite ends thereof are coupled to a movable contact main body to form an almost U shape and small contact points are surrounded by larger contact points. The first and the second U-shaped contact parts are slidingly moved in a direction crossing the arraying direction of the projections at the tips of the U-shaped contact parts in order to connect/disconnect the projections of the U-shaped contact points to/from a fixed contact thus tuning on/off the switch. The first and the second U-shaped contact parts have opposite ends coupled to the movable contact main body and strong in the movement in the arrow directions.

3 Claims, 6 Drawing Sheets

MOVABLE CONTACT OF SLIDE SWITCH

BACKGROUND OF THE INVENTION

The present invention relates to the movable contact of a slide switch designed to slidingly moving to connect/disconnect the tip of a contact to/from a fixed contact for switching.

For example, in a lever switch device for a vehicle, a slide switch operated with the operation of an operation lever rotatably provided in two directions crossing each other. The slide switch comprises a plurality of fixed contacts provided on a base and a movable contact in the shape of a flat spring forming a cross that slides on the base with the operation of the operation lever to come into contact with or separate from the fixed contact (for example refer to JP-A-2000-208003). This type of movable contact has contact parts extending in four directions and the switch is turned on or off when the tip of each contact part comes into contact with or separates from the fixed contact.

In this type of slide switch, as a countermeasure against chattering, as shown in FIG. 7, a contact part 2 of a movable contact is split into two pieces by a slit 3 extending in the extension direction of the contact part 2 in order to provide two split contact parts 4. Chattering refers to a phenomenon that the contact part of a movable contact comes into contact with or separates from the fixed contact in a short time due to vibration or the like. For a configuration shown in FIG. 7, the contact part 2 is split into two split contact parts 4, so that simultaneous chattering on the two split contact parts 4 can be prevented as far as possible.

For the above configuration the contact part 2 is split into two pieces; so that each split contact part is not sufficiently strong. When slidingly moving in the direction of an arrow A1 as an arraying direction of the two split contact parts, the tip of the split contact part 4 is likely to trip over a very small difference in level at the boundary of the top surface of the base and the fixed contact thus being deformed.

SUMMARY OF THE INVENTION

The invention has been accomplished in view of the above circumstances. An object of the invention is to provide a movable contact of a slide switch that can prevent chattering while enhancing the strength.

In order to solve the aforesaid object, the invention is characterized by having the following arrangement.
(1) A movable contact for a slide switch, the movable contact
  a movable contact main body;
  a small U-shaped contact part including opposite ends coupled to the movable contact main body; and
  a large U-shaped contact part that includes opposite ends coupled to the movable contact main body and surrounds the small U-shaped contact part,
  the small and large U-shaped contact parts are slidingly moved in a direction crossing a arraying direction of tips of the small and large U-shaped contact parts to connect/disconnect the tips to/from a fixed contact thus tuning on/off the switch.
(2) The movable contact according to (1), wherein the tips of the small and large U-shaped contact parts are formed with projections projecting toward the fixed contact, respectively.
(3) A lever switch apparatus comprising:
  an operation lever;
  a circuit board having a plurality of fixed contacts;
  a movable contact according to claim 1 which is operated by the operation lever for selectively connect to the plurality of fixed contacts.

According to the invention, the contact part of the movable contact is split into a plurality of U-shaped contact points. Thus, in case the U-shaped contact points are slidingly moved in a direction crossing the arraying direction of the tips of the U-shaped contact parts, chattering can be prevented. Each U-shaped contact point is sufficiently strong since its ends are coupled to the movable contact main body. In particular, the U-shaped contact point is strong in terms of movement in a direction crossing the arraying direction of the tips of the U-shaped contact parts.

BRIEF DESCRIPTION OF THE DRAWINGS

FIG. 5 is a view of the main section in FIG. 4 seen from the arrow a.

DETAILED DESCRIPTION OF PREFERRED EMBODIMENT

An embodiment will be described referring to FIGS. 1 through 6, where the invention is applied to a lever switch device for a vehicle.

Figure 2:
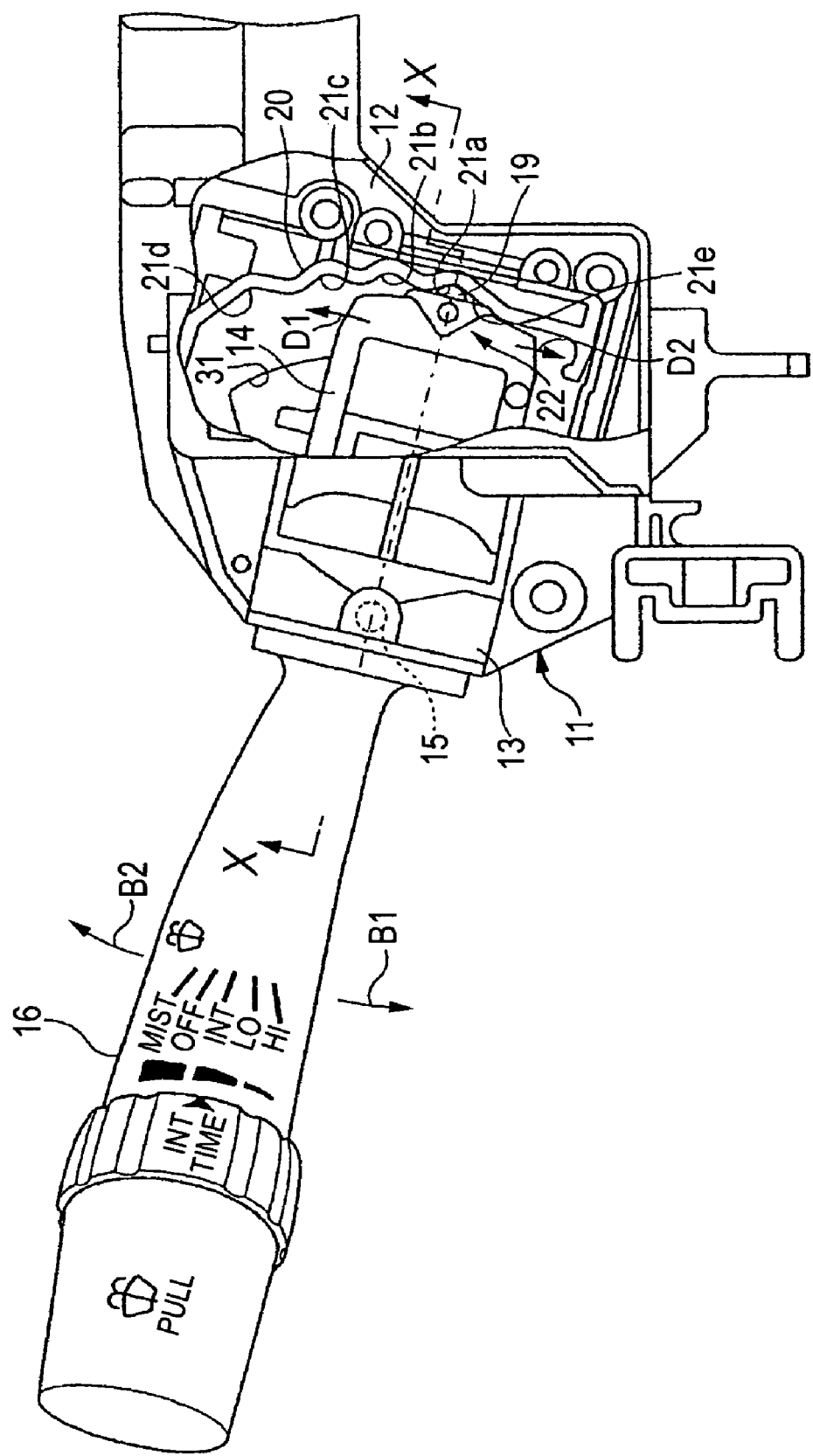
FIG. 2 is a cutaway plan view of a lever switch device.
Figure 3:
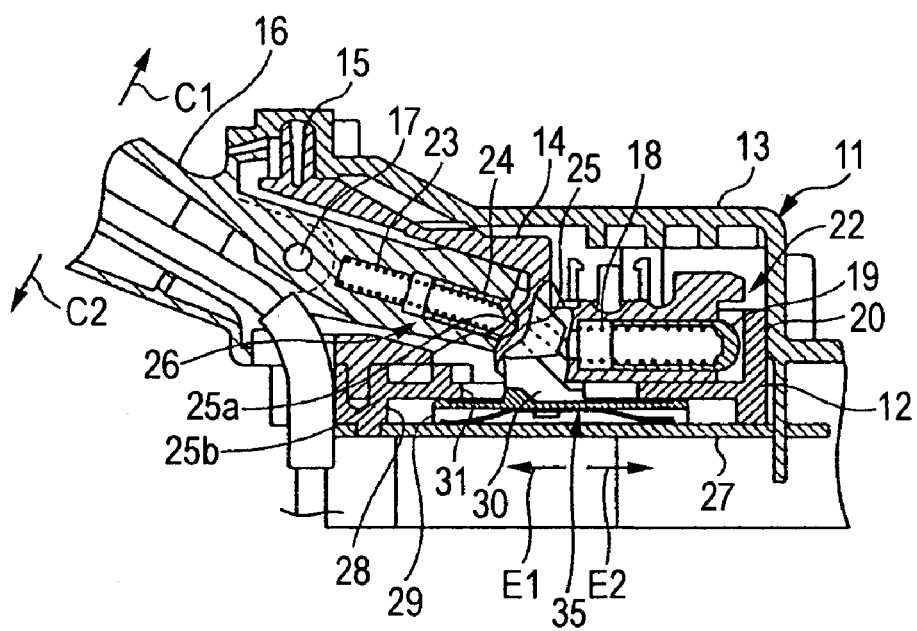
FIG. 3 is a horizontal side section taken along line X—X in FIG. 2.

Referring to FIGS. 2 and 3, the lever switch device is a switch device for operating a wiper or a washer. A switch case 11 comprises a combination of a base 12 and a cover 13. Inside the switch case 11 is rotatably arranged a bracket 14 about a shaft 15. Into the bracket 14 is inserted one end of the operation lever 16. The end of the operation lever 16 is rotatably attached to the bracket 14 by a shaft 17 crossing the shaft 15. The other end of the operation lever 16 protrudes leftward in FIGS. 2 and 3. The operation lever 16 can rotate, together with the bracket 14, about the shaft 15 in the directions of arrows B1 and B2 in FIG. 2. The operation lever can also rotate, separately from the bracket 14, about the shaft 17 in the directions of arrows c1 and c2 in FIG. 3.

At the tip of the bracket 14 are provided a helical compression spring 18 and a detent piece 19 energized in a protruding direction by the helical compression spring 18. The tip of the detent piece 19 comes into contact with a detent wall 20 provided on the base 12. The detent wall 20 comprises four recessed parts 21a through 21d for detent and a slant surface 21e for mist. The helical compression spring 18, the detent piece 19 and the detent wall 20 constitute a first detent 22.

At the tip of the operation lever 16 are provided a helical compression spring 23 and a detent piece 24 energized in a protruding direction by the helical compression spring 23. The tip of the detent piece 24 comes into contact with a detent wall 25 provided inside the bracket 14. The detent face 25 comprises a recessed part 25a for detent and a slant face 25b for washer. The helical compression spring 23, the detent piece 24 and the detent face 25 constitute a second detent 26.

On the bottom surface f the base 12 is provided a circuit board 27. A contact holder 29 is slidably accommodated in a housing unit 28 formed between the top surface of the circuit board 27 and the bottom surface of the base 12. Above the top surface of the contact holder is protruded an arm 30, which is inserted into the bracket 14 via an opening formed in the base 12 and is engaged with the operation lever 16.

Figure 4:
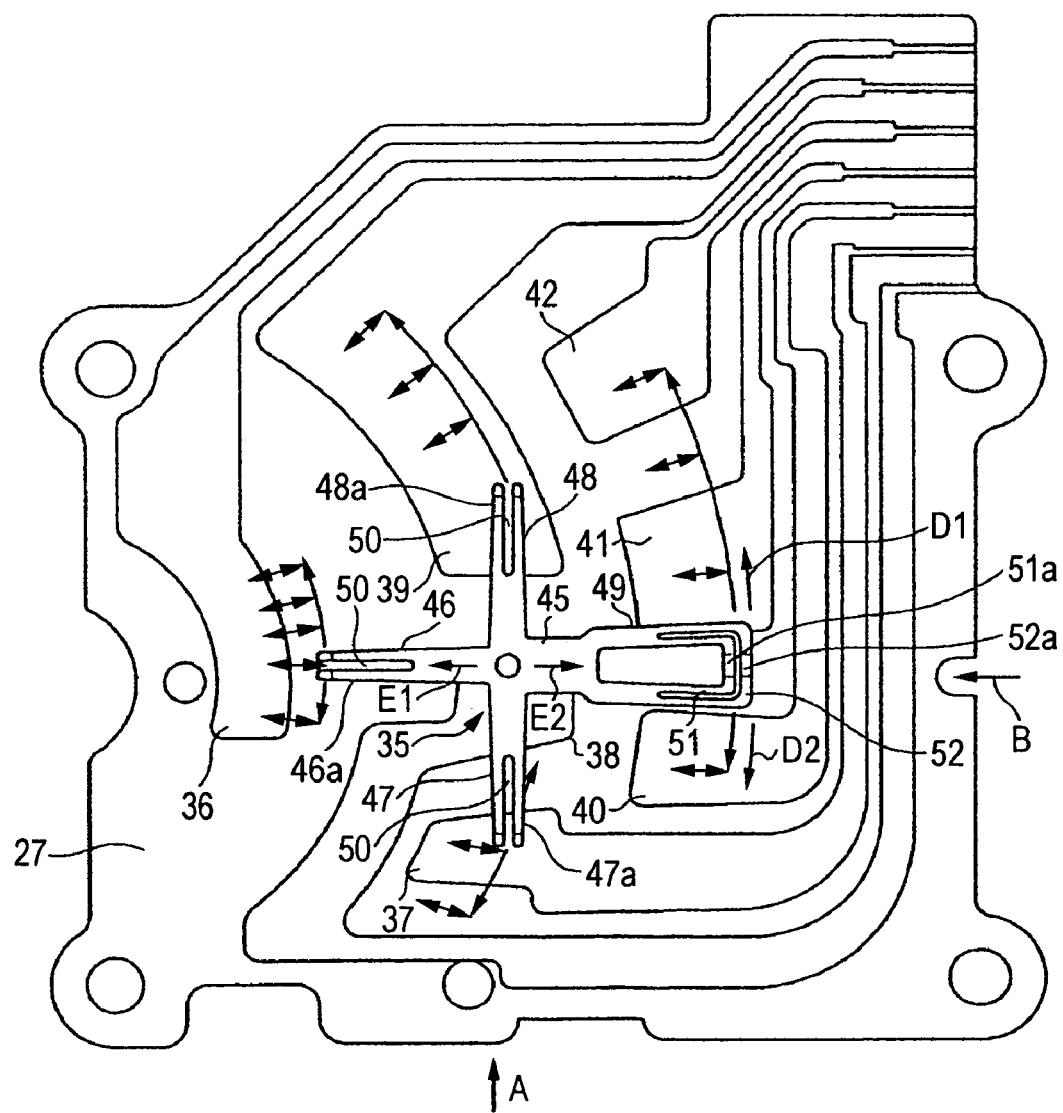
FIG. 4 is a plan view of the main section.

On the bottom surface of the contact holder 29 is attached a movable contact 35 of a cross-shaped flat spring. As shown in FIG. 4, on the circuit board 27 is provided a first fixed contact 36 on the left, second to fourth fixed contacts 37 through 39 in the middle section, and fifth to seventh fixed contacts 40 through 42 on the right. In this case, the first fixed contact 36 is set for washer, the second fixed contact 37 for OFF, the third fixed contact 38 for LO, the fourth fixed contact for ground, the fifth fixed contact 40 for MIST, the sixth fixed contact 41 for INT, the seventh fixed contact 42 for HI. The movable contact 35 and the first to seventh fixed contacts 36 through 42 constitute a slide switch.

Figure 5:
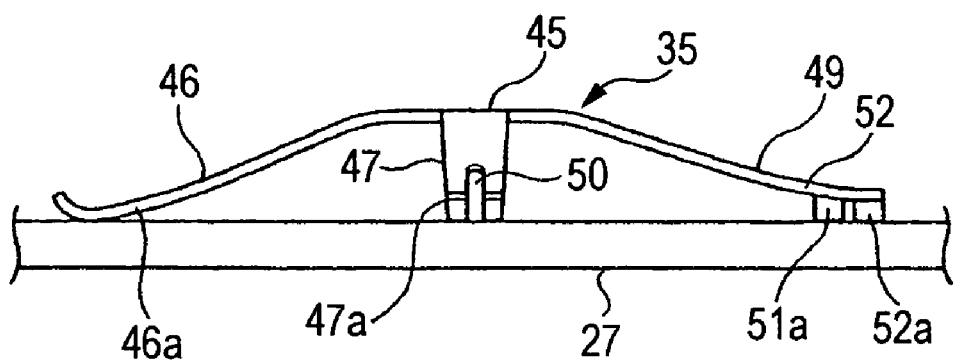
Figure 6:
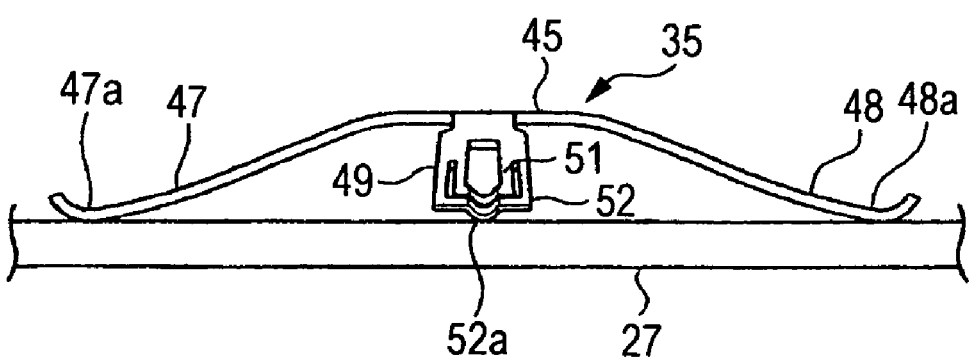
FIG. 6 is a view of the main section in FIG. 4 seen from the arrow b.
Figure 7:
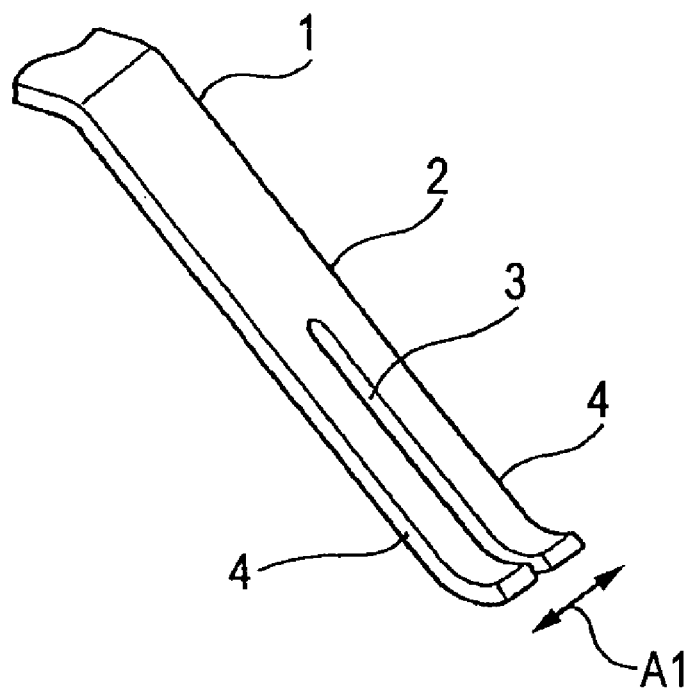
FIG. 7 is a view of a related art corresponding to FIG. 1.

The movable contact 35 will be detailed. The movable contact 35 integrally comprises first to fourth contact points 26 through 49 protruding in the direction 4 from the variable contact main body 45, as shown in FIGS. 4 through 6. The center of the movable contact 35 is fixed to the bottom surface of the contact holder 29. The first to fourth contact parts 46 through 49 respectively extend diagonally downward from the movable contact main body 45, with its tip slidably coming into contact with the top surface of the circuit board 27.

Out of the first to fourth contact parts 46 through 49, the first contact part 46 protruding in the left direction in FIG. 4 and the second and third contact points 47, 48 protruding downward and upward in FIG. 4 are split into pairs of split contact parts 46a, 47a, 48a by a slit 50 extending in the extension direction of each contact part.

Figure 1:
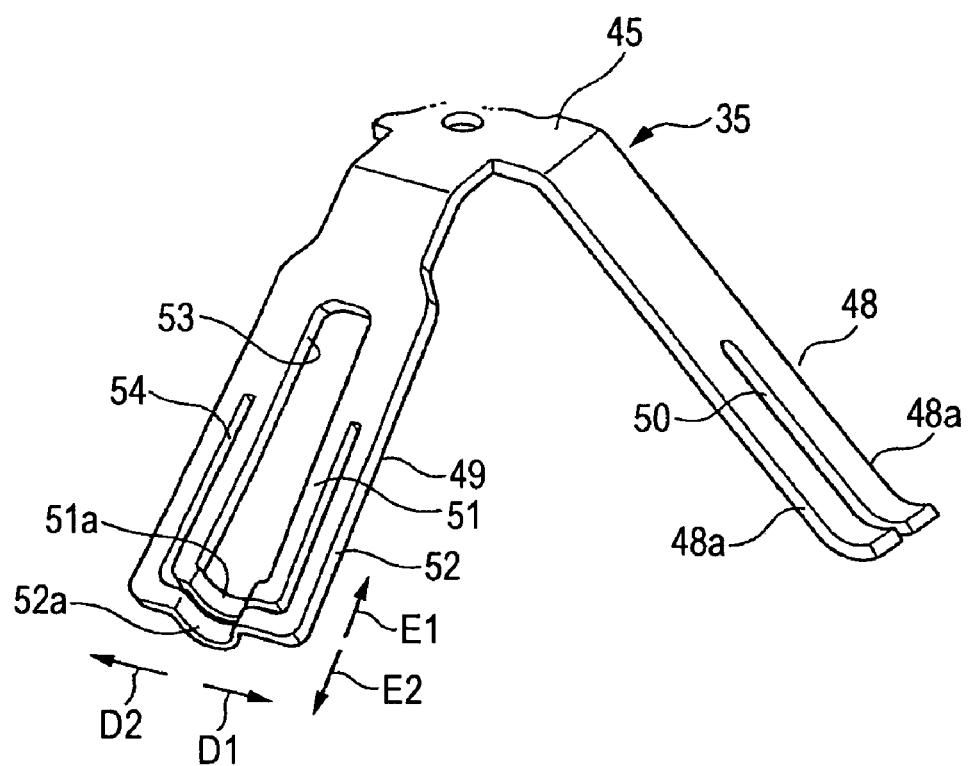
FIG. 1 is a perspective view of a main section showing one embodiment of the invention.

To the fourth contact 40 protruding rightward in FIG. 4 comprises, as shown in FIG. 1, a first U-shaped contact point 51 and a second U-shaped contact point 53 arranged to surround the first U-shaped contact point 51 outside thereof with a larger letter of U than the first U-shaped contact point, The first and second U-shaped contact points 51, 52 have opposite ends integrally coupled to the movable contact main body 45. Inside the first U-shaped contact point 51 is formed a slit 53. Between the first U-shaped contact point 51 and the second U shaped contact point 52 is formed a u-shaped slit 54. At the tips of the first and second U-shaped contact points 51, 52 is integrally formed arc-shaped projections 51a, 52b protruding downward (toward the circuit board 27). These projections 51a, 52a, are energized toward the circuit board 27 and comes into contact with the same.

The action of the above configuration will be described.

FIGS. 2 and 3 show a state where the operation lever 16 is located at the OFF position. In this state, the detent piece 19 of the first detent 22 is well in the recessed part 21a for detent of the detent wall 20 and the detent piece 24 of the second detent 26 is well in the recessed part 25a for detent of the detent face 25. In this state, the movable contact 35 is located at the position shown in FIG. 4. In particular, the tips of both split contacts 46a at the first contact part 46 are located to the right of the first fixed contact apart therefrom. The tips of both split contacts 47a at the second contact part 47 are in contact with the second fixed contact 37. The tips of both split contacts 48a at the third contact part 48 are in contact with the third fixed contact 38. The projections 51a, 52a of the first and second U-shaped contacts 51, 52 at the fourth contact point 49 are located between the fifth fixed contact 40 and the sixth fixed contact 41 apart therefrom. I this state, the switch is in the OFF state.

When the operation lever 16 is turned by one step in the arrow B1 direction from this OFF state, the tip of the bracket 14 rotates about the shaft 15 in the arrow D1 direction to receive the detent piece 19 of the first detent 22 into the recessed part 21b for detent of the detent wall 20. With this, the movable contact 35 slidingly moves in the arrow D1 direction together with the contact holder 29, and each contact point of the movable contact 35 slides in the arrow D1 direction on the circuit board 27. The tips of both split contacts 46a at the first contact part 46 of the movable contact 35 are located to the right of the first fixed contact 36 apart therefrom. The tips of both split contacts 47a at the second contact part 47 are located between the second fixed contact 37 and the third fixed contact 38 apart from the second fixed contact 37. The tips of both split contacts 48a at the third contact part 48 are in contact with the third fixed contact 38. The projections 51a, 52a of the first and second U-shaped contacts 51, 52 at the fourth contact point 49 are in contact with the sixth fixed contact 41. In this state, the switch is in the INT state (interval switch is ON) and a wiper (not shown), is intermittently operated.

When the operation lever 16 is further turned by one step in the arrow B1 direction from this INT state, the detent piece 19 of the first detent 22 is received, same as above, into the recessed part 21c for detent of the detent wall 20, and the movable contact 35 slidingly moves in the arrow D1 direction together with the contact holder 29. The tips of both split contacts 46a at the first contact part 46 of the movable contact 35 are located to the right of the fixed contact 36 apart therefrom. The tips of both split contacts 47a at the second contact part 47 are in contact with the third fixed contact 38. The tips of both split contacts 48a at the third contact part 48 are in contact with the third fixed contact 38. The projections 51a, 52a of the first and second U-shaped contacts 51, 52 at the fourth contact point 49 are located between the sixth fixed contact 41 and the seventh fixed contact 42 apart from the sixth fixed contact 41. In this state, the switch is in the LO state and the wiper is continuously operated at low speed.

When the operation lever 16 is further turned by one step in the arrow B1 direction from this LO state, the detent piece 19 of the first detent 22 is received into the recessed part 21d for detent of the detent wall 20, and the movable contact 35 slidingly moves in the arrow D1 direction together with the contact holder 29. The tips of both split contacts 46a at the first contact part 46 of the movable contact 35 are located to the right of the fixed contact 36 apart therefrom. The tips of both split contacts 47a at the second contact part 47 are located between the third fixed contact 38 and the fourth fixed contact 39 apart from the third fixed contact 38. The tips of both split contacts 48a at the third contact part 48 are in contact with the third fixed contact 38. The projections 51a, 52a of the first and second U-shaped contacts 51, 52 at the fourth contact point 49 are in contact with the seventh fixed contact 42. In this state, the switch is in the HI state and the wiper is continuously operated at high speed.

When the operation lever is rotated in the arrow B2 direction which is opposite to the arrow B1 from the HI position, the inverse operation of the above takes place.

When the operation lever 16 is rotated in the arrow B2 direction with the operation lever 16 located in the OFF position (FIG. 2), the detent piece 19 of the first detent 22 moves in the arrow B2 direction to ascend the slant face 21e for mist of the detent wall 20. The tips of both split contacts 46a at the first contact part 46 of the movable contact 35 are located to the right of the first fixed contact 36 apart therefrom. The tips of both split contacts 47a at the second contact part 47 are located apart from the second fixed contact 37. The tips of both split contacts 48a at the third contact part 48 are in contact with the third fixed contact 38. The projections 51a, 52a of the first and second U-shaped contacts 51, 52 at the fourth contact point 49 are in contact with the fifth fixed contact 40. In this state, the switch is in the MIST state. While the operation lever is kept in the LIST position, the wiper is operated.

In this case, when operation of the operation lever 16 is released, the detent piece 19 of the first detent 22 descends the slant face 21e for mist of the detent wall 20 and is received in the recessed part 21a for detent and is automatically returned to the OFF position in FIG. 2.

When the operation lever 16 is pulled toward you in the above position (OFF, INT, LO, HI) to rotate it in the arrow C1 direction, the detent piece 24 of the second detent 26 ascends the slant face 25b for washer of the detent wall 25. The contact holder 29 moves in the arrow E1 direction in FIGS. 3 and 4 via the arm 30. This brings the tips of both split contacts 46a at the first contact part 46 of the movable contact 35 in contact with the first fixed contact 36. Note that the state of each of the second to fourth contact points 47 through 49 remains unchanged. In this state, the switch is in the WASHER state where the washer operates.

In this case, when operation of the operation lever 16 is released, the detent piece 24 of the second detent 26 descends the slant face 25a for washer of the detent face 25 and is received in the recessed part 25a for detent and is automatically returned to the OFF position in FIG. 2. The movable contact 35 also moves in the arrow E2 direction which is the opposite to the arrow E1 direction and is returned.

In the embodiments described, the fourth contact 49 of the movable contact 35 comprises a first and a second U-shaped contact points 51, 52, opposite ends thereof coupled to the movable contact main body 45 to form an almost U shape where small contact points are surrounded by larger contact points, characterized in that the first and the second U-shaped contact parts 51, 52 are slidingly moved in a direction (D1, D12) crossing the arraying direction (E1, E2) of the projections 51a, 52a at the tips of the U-shaped contact parts in order to connect/disconnect the projections 51a, 52a of each U-shaped contact point to/from the fixed contacts 40 through 42 thus turning on/off the switch.

Thus, in case the fourth contact point 49 of the movable contact 35 is sligingly moved in a direction crossing the arraying direction of the projections 51a, 52a at the tips thereof, it is possible to effectively prevent chattering. The first and the second U-shaped contact parts 51, 52 at the fourth contact part 49 have sufficient strength since their opposite ends are coupled to the movable contact main body 35. In particular, in case the first and the second U-shaped contact parts 51, 52 are moved in a direction crossing the arraying direction of their tips (projections 51a, 52a), the first and the second U-shaped contact parts 51, 52 are not likely to trip over a very small difference in level, if any, at the boundary of a fixed contact and the remaining portion on the circuit board 27, and particularly strong in the movement in the direction.

The first contact part 46 of the movable contact 35 is split into a pair of split contact parts 46a by a slit 50, which configuration is effective against chattering. In this case, movement in the arraying direction (arrow D1, D2) of the tips of the two split contact parts 46a is not related to the switching, and does not trip over a small difference in level, thus the contact point 46 is sufficiently strong. Movement in a direction (arrow E1, E2) crossing the arraying direction of the tips of the two split contact parts 46a does not trip over a difference in level, if any, thus the contact point 46 is sufficiently strong.

The second contact part 47 of the movable contact 35 is split into a pair of split contact parts 47a by the slit 50, which configuration is effective against chattering. In this case, movement in the arraying direction (arrow E1, E2) of the tips of the two split contact parts 47a is not related to the switching, and does not trip over a small difference in level, thus the contact point 47 is sufficiently strong. Movement in a direction (arrow D1, D2) crossing the arraying direction of the tips of the two split contact parts 47a does not trip over a difference in level, if any, thus the contact point 47 is sufficiently strong.

The third contact part 48 of the movable contact 35 is split into a pair of split contact parts 48a by the slit 50, which configuration is effective against chattering. In this case, movement in the arraying direction (arrow E1, E2) of the tips of the two split contact parts 48a or in a direction (arrow D1, D2) crossing the arraying direction is not related to the switching (there are no difference in level). Thus the contact point 48 is sufficiently strong.

The invention is not limited to the above embodiments but variations or expansions such as the following is possible.

The movable contact 35 may has a shape other than a cross.

What is claimed is:

1. A movable contact for a slide switch, the movable contact comprising:
    a movable contact main body;
    a small U-shaped contact part including opposite ends coupled to the movable contact main body; and
    a large U-shaped contact part that includes opposite ends coupled to the movable contact main body and surrounds the small U-shaped contact part,
    the small and large U-shaped contact parts are slidingly moved in a direction crossing an arraying direction of tips of the small and large U-shaped contact parts to connect/disconnect the tips to/from a fixed contact thus turning on/off the switch.

2. The movable contact according to claim 1, wherein the tips of the small and large U-shaped contact parts are formed with projections projecting toward the fixed contact, respectively.

3. A lever switch apparatus comprising:
    an operation lever;
    a circuit board having a plurality of fixed contacts;
    a movable contact according to claim 1 which is operated by the operation lever for selectively connect to the plurality of fixed contacts.

* * * * *